(12) United States Patent
Tribelhorn et al.

(10) Patent No.: US 9,493,604 B2
(45) Date of Patent: Nov. 15, 2016

(54) COMPOSITIONS CONTAINING AROMATIC ISOCYANATE FUNCTIONAL COMPONENTS AND ALIPHATIC AROMATICS ISOCYANATE FUNCTIONAL COMPONENTS HAVING IMPROVED CURE SPEED

(71) Applicant: Dow Global Technologies LLC, Midland, MI (US)

(72) Inventors: Ulrich Tribelhorn, Ebikon (CH); Dirk Schwoeppe, Freienbach (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 98 days.

(21) Appl. No.: 14/379,644

(22) PCT Filed: Jan. 29, 2013

(86) PCT No.: PCT/US2013/023571
§ 371 (c)(1),
(2) Date: Aug. 19, 2014

(87) PCT Pub. No.: WO2013/126183
PCT Pub. Date: Aug. 29, 2013

(65) Prior Publication Data
US 2015/0013904 A1  Jan. 15, 2015

Related U.S. Application Data

(60) Provisional application No. 61/601,189, filed on Feb. 21, 2012.

(51) Int. Cl.
| | | |
|---|---|---|
| C09J 11/04 | (2006.01) | |
| C08G 18/79 | (2006.01) | |
| C08G 18/72 | (2006.01) | |
| C08G 18/76 | (2006.01) | |
| C08G 18/10 | (2006.01) | |
| C09J 175/08 | (2006.01) | |
| B32B 37/00 | (2006.01) | |
| C08G 18/20 | (2006.01) | |
| C08G 18/24 | (2006.01) | |
| C08G 18/48 | (2006.01) | |
| C08G 18/73 | (2006.01) | |
| C08G 18/78 | (2006.01) | |
| C08K 3/34 | (2006.01) | |

(52) U.S. Cl.
CPC ............ C08G 18/79 (2013.01); B32B 37/0038 (2013.01); C08G 18/10 (2013.01); C08G 18/2063 (2013.01); C08G 18/242 (2013.01); C08G 18/4829 (2013.01); C08G 18/725 (2013.01); C08G 18/73 (2013.01); C08G 18/7685 (2013.01); C08G 18/78 (2013.01); C08G 18/797 (2013.01); C08K 3/346 (2013.01); C09J 11/04 (2013.01); C09J 175/08 (2013.01); B32B 2255/10 (2013.01)

(58) Field of Classification Search
CPC ........... C08K 3/346; C09J 175/08; C09J 11/04
USPC ............................... 524/789; 156/331, 331.4
See application file for complete search history.

(56) References Cited

U.S. PATENT DOCUMENTS

| | | | |
|---|---|---|---|
| 3,707,521 A | 12/1972 | De Santis | |
| 3,779,794 A | 12/1973 | De Santis | |
| 4,345,053 A | 8/1982 | Rizk et al. | |
| 4,374,237 A | 2/1983 | Berger et al. | |
| 4,525,511 A | 6/1985 | Kirby et al. | |
| 4,538,920 A | 9/1985 | Drake | |
| 4,625,012 A | 11/1986 | Rizk et al. | |
| 5,041,517 A | 8/1991 | Vu et al. | |
| 5,082,147 A | 1/1992 | Jacobs | |
| 5,143,996 A * | 9/1992 | Chung | B32B 7/00 156/331.4 |
| 5,623,044 A | 4/1997 | Chiao | |
| 5,951,796 A | 9/1999 | Murray | |
| 6,015,475 A | 1/2000 | Hsieh | |
| 6,512,033 B1 | 1/2003 | Wu | |
| 6,709,539 B2 | 3/2004 | Zhou | |
| 6,965,008 B2 | 11/2005 | Symietz et al. | |
| 7,892,395 B2 | 2/2011 | Tribelhorn et al. | |
| 2002/0100550 A1 | 8/2002 | Mahdi et al. | |
| 2009/0044907 A1 | 2/2009 | Tribelhorn et al. | |

FOREIGN PATENT DOCUMENTS

| | | |
|---|---|---|
| EP | 1433802 A1 | 6/2004 |
| EP | 195975 A1 | 8/2008 |
| EP | 2011808 A1 | 1/2009 |
| WO | 02/062864 A2 | 8/2002 |
| WO | 2004/056903 A1 | 7/2004 |
| WO | 2005/037885 A1 | 4/2005 |
| WO | 2007/128824 A1 | 11/2007 |
| WO | 2009/015149 A1 | 1/2009 |

* cited by examiner

*Primary Examiner* — Kelechi Egwim
(74) *Attorney, Agent, or Firm* — The Dobrusin Law Firm, P.C.; Norman L. Sims (57) ABSTRACT

A composition comprising in Part 1: a) one or more isocyanate functional components having aromatic isocyanate functional groups; and b) one or more isocyanate functional components having aliphatic isocyanate functional groups; and in Part 2 c) one or more compounds having more than one isocyanate reactive groups: wherein the ratio of aromatic isocyanate functional groups to isocyanate reactive groups is from 0.95 to 1.05 and the ratio of aromatic isocyanate functional groups and aliphatic isocyanate functional groups (total isocyanate groups) to isocyanate reactive groups is from 1.10 to 1.30.

11 Claims, 1 Drawing Sheet

COMPOSITIONS CONTAINING AROMATIC ISOCYANATE FUNCTIONAL COMPONENTS AND ALIPHATIC AROMATICS ISOCYANATE FUNCTIONAL COMPONENTS HAVING IMPROVED CURE SPEED

FIELD OF THE INVENTION

The invention relates to curable compositions containing isocyanate functional components which exhibit improved cure speed and longer tack free time and to methods of bonding substrates together utilizing such compositions.

BACKGROUND OF THE INVENTION

Compositions having isocyanate functional components are utilized in a variety of useful products such as adhesives, molded products and foams. Such compositions are utilized in construction, vehicle manufacture, assembly of electronic subassemblies and devices, toys and the like. The adhesives are used to bond substrates together and have found widespread use because they allow for reasonable processing conditions and exhibit good adhesion to many substrates. One common use of such compositions is to bond glass, often in the form of windows, into structures. Two-part polyisocyanate based adhesives comprise, in one part, a polyisocyanate or an isocyanate functional prepolymer and in a second part a curing agent and catalyst for the reaction of the curing agent with isocyanate groups. The curing agent is a compound having on average more than one active hydrogen atom, for instance an amine or hydroxyl moiety. Two part adhesives are often used for bonding parts to together or to other structures, for example bonding trim parts to vehicles or bonding replacement windows into vehicles. Examples of such adhesive systems include those disclosed in U.S. Pat. No. 7,892,395; US 2009/0044907; U.S. Pat. No. 6,965,008; EP 1433802 and EP 1578834, all incorporated herein by reference in their entirety. The adhesive starts to cure when the two parts are contacted. Two-part adhesives have the advantage that they cure much faster than one-part adhesives.

Manufacturers desire to handle products as soon as possible to enhance the productivity of their plants, as there is a need to move parts and to place loads on adhesive systems as soon as possible. Adhesives which have a good green strength shortly after application are needed. Adhesives are needed that exhibit longer open times, the time from application of the adhesive to a substrate until the adhesive can no longer adhere to another substrate.

What is needed is an adhesive system which exhibits good green strength, rapid cure rates and allows substrates to be handled shortly after application of the adhesive system.

SUMMARY OF THE INVENTION

The invention relates to a composition comprising Part 1: a) one or more isocyanate functional components having aromatic isocyanate functional groups; and b) one or more isocyanate functional components having aliphatic isocyanate functional groups; and Part 2: c) one or more compounds having more than one isocyanate reactive groups: wherein the ratio of aromatic functional groups to isocyanate reactive groups is from 0.95 to 1.05 and the ratio of aromatic isocyanate functional groups and aliphatic isocyanate functional groups (total isocyanate groups) to isocyanate reactive groups is from 1.10 to 1.30. The composition may further contain one or more fillers in one or both of Part 1 and Part 2. Exemplary fillers include one or more clays. The one or more isocyanate functional components having aromatic isocyanate functional groups may comprise one or more prepolymers having aromatic isocyanate functional groups. In a preferred embodiment the one or more isocyanate functional components having aromatic isocyanate functional groups comprises one or more polyisocyanates having aromatic isocyanate functional groups and one or more isocyanate functional group containing prepolymers having in their backbones the residue of one or more chains of one or more polypropylene oxides, copolymers of ethylene oxide and propylene oxide or mixtures thereof wherein equivalent weight of the chains are predominantly greater than about 780 and having aromatic isocyanate functional groups; and the isocyanate reactive component comprises one or more polypropylene oxides, copolymers of ethylene oxide and propylene oxide or mixtures thereof having equivalent weights predominantly about 960 or greater and terminal groups which are reactive with isocyanate groups, and one or more low molecular weight compounds having two or more isocyanate reactive groups and a molecular weight of 120 or less.

In another embodiment the invention relates to a method of bonding two or more substrates together comprising i) contacting Part 1 and Part 2 according to any embodiment of the invention; ii) contacting the mixture of step i) with one or more substrates; iii) contacting the substrates together with the mixture of step i) disposed between the substrates; iv) allowing the mixture of step i) to cure so as to bond the substrates together. In another embodiment the two part compositions as described herein may further comprise one or more known blowing agents.

The compositions are useful in any known use of curable compositions containing isocyanate functional components, such as coatings, adhesives, open and closed cell foams, molded products and the like. The curable compositions may be used as adhesives to bond substrates together. A variety of similar and dissimilar, porous and nonporous, substrates may be bonded together using the compositions, for instance, plastics, glass, wood, ceramics, metal, coated substrates and the like. The compositions are useful in bonding glass or coated plastic to substrates, i.e. windows into vehicles or buildings, or parts of modular components together, such as vehicle modular components, i.e. vehicle modules, such as door, window or body. The compositions of the invention exhibit rapid cure speeds with longer tack free times.

DETAILED DESCRIPTION

The disclosures of all articles and references, including patent applications and publications, are incorporated by reference for all purposes. The following claims are also hereby incorporated by reference into this written description.

One or more as used herein means that at least one, or more than one, of the recited components are present. Nominal functionality means the theoretical functionality, which can be calculated from the stoichiometry of the ingredients used. The actual functionality is different due to imperfections in raw materials, incomplete conversion of the reactants and formation of by-products. Isocyanate content means the weight percentage of isocyanate moieties based on the total weight of the isocyanate components. The term "isocyanate-reactive compound" as used herein includes any organic compound having nominally at least two isocyanate-reactive moieties. For the purposes of this invention, an active hydrogen containing moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable isocyanate-reactive compounds (active hydrogen containing compounds) include polyols, polyamines, polymercaptans and polyacids, more preferably, polyols. Aromatic isocyanate group means an isocyanate group covalently bonded to an aromatic carbon atom. Aliphatic isocyanate group means an isocyanate group covalently bonded to an aliphatic carbon atom.

The compositions of this invention are reactive systems containing isocyanate functional components which are curable. Reactive means herein that the curable composition (e.g. adhesive) contains components which react to form a polymeric matrix that is set irreversibly once cured. The curable systems are two-part systems, preferably useful as adhesives.

Isocyanate based (polyurethane or polyurea forming) curable systems comprise two or more isocyanate functional components, one or more aromatic isocyanate functional components and one or more aliphatic isocyanate functional components. An isocyanate functional component contains one or more compounds having on average more than one isocyanate functional group per molecule. The isocyanate functional compounds can be any compounds which contain on average more than one isocyanate moiety. The isocyanate functional components can be in the form of isocyanate functional prepolymers, monomers or oligomers having on average greater than 1 isocyanate group, and preferably 2 or more isocyanate groups. The isocyanate prepolymers can by any prepolymers prepared by reaction of an isocyanate functional compound with one or more compounds having on average more than one isocyanate reactive functional groups, such as hydroxyl, amine, thiol, carboxyl and the like, under conditions such that the prepolymers prepared have on average more than one isocyanate moiety (group) per molecule. The isocyanate functional components are present in the curable composition in a sufficient amount to form a cured component when exposed to curing conditions. The isocyanate functional components when combined with isocyanate reactive compounds are capable of bonding substrates together in a manner that the substrates remain bound together when exposed to temperatures of −30° C. to 100° C. for long periods of time, such as 10 years; and up to temperatures of 180° C. for short periods of up to 30 minutes.

The isocyanate functional components contain a sufficient amount of aromatic isocyanate groups to speed the cure of the two components when contacted as measured by lap shear strength at certain designated times from contacting of the parts or contacting of the contacted parts with one or more substrates. The amount of the isocyanate functional components is chosen to provide a sufficient amount of aromatic isocyanate groups in relation the amount of isocyanate reactive groups in the curative. The amount of the isocyanate functional components is chosen to provide a sufficient amount of aromatic isocyanate groups such that the ratio of aromatic isocyanate groups in part A to the amount of isocyanate reactive groups in the part B fall within a preferably ratio range. Preferably the ratio of aromatic isocyanate groups in part A to the amount of isocyanate reactive groups in the part B is about 0.95:1 or greater, more preferably about 0.97:1 or greater and most preferably about 0.98:1 or greater. Preferably the ratio of aromatic isocyanate groups in part A to the amount of isocyanate reactive groups in the part B is about 1.05:1 or less, more preferably about 1.03 or less and most preferably about 1.02:1 or less. The isocyanate functional components contain a sufficient amount of aliphatic isocyanate groups to improve the final cured strength typically measured after about 7 days from cure and adhesion to substrate surfaces. Preferably the amount of aliphatic isocyanate groups is expressed as the part of the total amount of isocyanate groups expressed as a ratio of total isocyanate groups in part A to the total amount of isocyanate reactive groups in part B. The amount of aliphatic isocyanate groups can be calculated from the ratio of aromatic isocyanate groups to isocyanate reactive groups and the ratio of total isocyanate groups in part A to isocyanate reactive groups in part B. The ratio of total isocyanate groups in part A to isocyanate reactive groups in part B is chosen to provide rapid cure, with longer tack free times and high overall final cure strength. Preferably the ratio of total isocyanate groups in part A to the amount of isocyanate reactive groups in the part B is about 1.10:1 or greater and most preferably about 1.14:1 or greater. Preferably the ratio of aromatic isocyanate groups in part A to the amount of isocyanate reactive groups in the part B is about 1.30:1 or less, more preferably about 1.20:1 or less and most preferably about 1.18:1 or less. The aromatic isocyanate groups and aliphatic isocyanate groups may be located on the same isocyanate functional components or different isocyanate functional components, preferably different isocyanate functional components. Preferably a portion of the aromatic isocyanate groups are located on isocyanate functional prepolymers. Preferably the aliphatic isocyanate groups are located on polyisocyanates or addition products of polyisocyanates.

The curable system is a two-part polyisocyanate component containing curable system. The two parts are reactive with one another and when contacted undergo cure. One part of the composition comprises, or contains, two or more isocyanate functional components as described hereinbefore, typically referred to as the resin side or A side. The other component comprises one or more isocyanate reactive components which comprises, or contains, one or more compounds, oligomers or prepolymers having on average more than one group reactive with isocyanate moieties, commonly known as the curative or B side. Compounds having on average one or more isocyanate reactive groups can be compounds, prepolymers, small chain compounds such as difunctional chain extenders or polyfunctional cross-linking agents known in the art or mixtures thereof. A catalyst as described hereinbefore may be utilized in the curative side. The reaction product is a cured product which is capable of performing the desired function, such as bonding certain substrates together.

The isocyanate functional component is present in the curable composition in a sufficient amount to form a cured component when exposed to curing conditions. In embodiments using one or more isocyanate functional prepolymers, such prepolymers are present in sufficient quantity to provide cohesive strength, and in adhesive uses, adhesive character to the composition. Isocyanate functional prepolymers have an average isocyanate functionality sufficient to allow the preparation of a crosslinked polyurethane upon cure and not so high that the prepolymers are unstable. The prepolymers are prepared by reacting one or more polyisocyanates with one or more compounds containing on average more than one isocyanate reactive group per molecule. Preferably the isocyanate functional prepolymers are the reaction product of one or more polyisocyanates and one or more isocyanate reactive compounds wherein an excess of polyisocyanate is present on equivalent basis, preferably an excess of about 0.6 equivalents or greater. The prepolymer preferably has a free isocyanate content which facilitates acceptable strength in the compositions prepared from the prepolymers, preferably after 60 minutes. The isocyanate content of part 1 including all of the isocyanate function components is preferably about 5 percent by weight or greater and most preferably in the about 7 by weight or greater. The isocyanate content of the part 1 is preferably about 32 percent by weight or less, more preferably about 25 percent by weight or less and most preferably about 17 percent by weight or less. The prepolymers preferably exhibit a polydispersity of about 2.5 or less, more preferably about 2.3 or less and most preferably about 2.1 or less.

Exemplary polyisocyanates useful in the invention and in preparing isocyanate functional prepolymers include any aliphatic, cycloaliphatic, araliphatic, heterocyclic or aromatic polyisocyanates, or mixtures thereof. Preferably, the polyisocyanates used have an average isocyanate functionality of about 2.0 or greater and an equivalent weight of about 80 or greater. Preferably, the isocyanate functionality of the polyisocyanates is about 2.0 or greater, more preferably about 2.2 or greater, and is most preferably about 2.4 or greater; and is preferably about 4.0 or less, more preferably about 3.5 or less, and most preferably about 3.0 or less. Higher functionality may be used, but may cause excessive cross-linking and result in a composition which is too viscous to handle and apply easily, and can cause the cured composition to be too brittle. Preferably, the equivalent weight of the polyisocyanates is about 80 or greater, more preferably about 110 or greater, and is most preferably about 120 or greater; and is preferably about 300 or less, more preferably about 250 or less, and most preferably about 200 or less. Exemplary aliphatic polyisocyanates include those disclosed by Wu, U.S. Pat. No. 6,512,033 at column 3, line 3 to line 49, incorporated herein by reference. More preferred aliphatic isocyanates include, isophorone diisocyanate, tetramethylxylene diisocyanate, 1,6-hexa-methylene diisocyanate and oligomeric or polymeric derivatives thereof, bis(4-isocyanato-cyclohexyl)methane, and trimethyl hexamethylene diisocyanate. The most preferred aliphatic isocyanates are is hexamethylene diisocyanate and oligomeric and polymeric derivatives thereof. Examples of preferred aliphatic isocyanates include trimers of hexamethylene diisocyanate, such as those available from Bayer under the trademark and designation DESMODUR N3300, DESMODUR N3400, DESMODUR N-100. Exemplary aromatic polyisocyanates include those disclosed by Wu, U.S. Pat. No. 6,512,033 at column 3, line 3 to line 49, incorporated herein by reference. More preferred aromatic isocyanates include diphenylmethane diisocyanate, toluene diisocyanate and polymeric derivatives thereof. The most preferred isocyanate is diphenylmethane diisocyanate. The amount of isocyanate containing compound used to prepare the prepolymer is that amount that gives the desired properties, the appropriate free isocyanate content and viscosities as discussed herein. Oligomeric aromatic polyisocyanates useful include those available from The Dow Chemical Company under the trademarks PAPI and VORANATE, such as VORANTE M220, PAPI 27 and PAPI 20 polymeric isocyanates.

Preferable polyols useful in the preparation of the prepolymers include those disclosed in Wu, U.S. Pat. No. 6,512,033 at column 4, line 10 to line 64, incorporated herein by reference. Exemplary polyols include polyether polyols, polyester polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. Where a mixture of alkylene oxide units is contained in a polyol, the different units can be randomly arranged or arranged in blocks of each alkylene oxide. In one preferred embodiment, the polyol comprises propylene oxide chains with ethylene oxide chains capping the polyol. In a preferred embodiment, the polyols are a mixture of diols and triols. Preferably, the isocyanate-reactive compound has a functionality of about 1.9 or greater, more preferably about 1.95 or greater, and is most preferably about 2.0 or greater; and is preferably about 4.0 or less, more preferably about 3.5 or less, and is most preferably about 3.0 or less. Preferably, the equivalent weight of the isocyanate-reactive compounds is about 200 or greater, more preferably about 500 or greater, and more preferably about 1,000 or greater; and is preferably about 5,000 or less, more preferably about 3,000 or less, and most preferably about 2,500 or less.

The adhesive compositions may further comprise one or more isocyanate functional prepolymers or isocyanate reactive compounds in the form of prepolymers containing one or more organic based polymers dispersed therein or grafted to the backbone. The preferable organic base polymer containing triols are disclosed in Zhou, U.S. Pat. No. 6,709,539 at column 4, line 13 to column 6, line 18, incorporated herein by reference. Preferably, the triols used to disperse or graft the organic particles is one or more polyether triols and more preferably one or more polyoxyalkylene based triols, which preferably comprise polyoxypropylene chains with a polyoxyethylene end caps. Most preferred triols are ethylene oxide-capped polyols prepared by reacting glycerin with propylene oxide, followed by reacting the product with ethylene oxide. Preferably, the organic particles comprise one or more of thermoplastic polymers, rubber-modified thermoplastic polymers or polyureas. Preferably such prepolymers containing organic particles are contained in the adhesive in an amount of about 5 percent by weight or greater. Preferably such prepolymers containing organic particles are contained in the adhesive in an amount of about 40 percent by weight or less.

The isocyanate reactive compounds may be present in isocyanate functional prepolymers in an amount sufficient to react with most of the isocyanate groups of the isocyanates leaving enough isocyanate groups to correspond with the desired free isocyanate content of the prepolymer. Preferably, the components containing active hydrogen groups are present in an amount of about 50 parts by weight or greater based on the prepolymer, more preferably about 65 parts by weight or greater and most preferably about 80 parts by weight or greater. Preferably, the components containing active hydrogen groups are present in an amount of about 90 parts by weight or less based on the prepolymer and most preferably about 85 parts by weight or less.

The prepolymers may be prepared by any suitable method, such as bulk polymerization and solution polymerization. The process may be carried out under anhydrous conditions, preferably under an inert atmosphere, such as a nitrogen blanket, to prevent crosslinking of the isocyanate groups by moisture. The reaction is preferably carried out at a temperature from about 0° C. to about 150° C., more preferably from about 25° C. to about 90° C., until the residual isocyanate content determined by titration of a sample is very close to the desired theoretical value. The reactions to prepare the prepolymer may be carried out in the presence of urethane catalysts, for example stannous salts of carboxylic acids, such as stannous octoate, stannous oleate, stannous acetate, and stannous laurate; dialkyltin dicarboxylates, such as dibutyltin dilaurate and dibutyltin diacetate; tertiary amines and tin mercaptides. Preferably, the catalyst is stannous octoate. The amount of catalyst employed is generally from about 0.005 to about 5 parts by weight of the mixture catalyzed. Preferably, the reaction is carried out in admixture with a plasticizer. Preferably a polyether diol, having an effective functionality of at least about 1.9, preferably at least about 1.95 and a polyether triol, having an effective functionality of at least about 2.8, preferably at least about 2.9 are reacted with an aromatic polyisocyanate with a functionality of at least about 2.0. Preferred polyether diols have a molecular weight of about 1,000 or greater and more preferably about 3000 or greater. Preferred polyether diols have a molecular weight of about 9,000 or less and more preferably about 6,000 as or less. Such molecular weight are calculated from the OH-number and functionality. In a preferred embodiment, the prepolymers or curing agents comprising copolymers of ethylene oxide and propylene oxide contain about 40 weight percent or less of ethylene oxide monomer units, even more preferably 25 weight percent or less of ethylene oxide monomer units, even more preferably about 15 weight percent or less of ethylene oxide monomer units and most preferably about 12 weight percent or less of ethylene oxide monomer units. In a preferred embodiment, where ethylene monomer units are present, they are present in an amount of 5 percent by weight or greater and more preferably about 8 percent by weight or greater.

In one embodiment, the isocyanate functional prepolymers have in their backbone the residue of one or more chains of one or more polypropylene oxide, copolymers of ethylene oxide and propylene oxide or mixtures thereof which have chain lengths such that the glass transition temperature of the cured polymers containing such prepolymers is about −40° C. or less, more preferably about −45° C. or less and most preferably about −50° C. or less. Preferably the isocyanate reactive group containing compounds utilized in part 2 comprise with one or more polypropylene oxide based polyols, copolymers of ethylene oxide and propylene oxide based polyols or mixtures thereof. Preferably, the isocyanate functional prepolymer or the isocyanate reactive group containing compounds have in their backbones the residue of one or more chains of one or more polypropylene oxides, copolymers of ethylene oxide and propylene oxide or mixtures thereof which chains have equivalent weights of about 780 or greater, more preferably about 960 or greater, even more preferably about 1,000 or greater and most preferably about 1,500 or greater. Preferably, the isocyanate functional prepolymer or the isocyanate reactive compounds have in their backbone the residue of one or more chains of one or more polypropylene oxides, copolymers of ethylene oxide and propylene oxide or mixtures thereof which chains have equivalent weights of about 4,000 or less, more preferably about 3,000 or less and most preferably about 2,000 or less. In one preferred embodiment, one or more of the isocyanate functional prepolymers or one or more of the isocyanate reactive compounds have in their backbone the residue of one or more polypropylene oxides, copolymers of ethylene oxide and propylene oxide or mixtures thereof wherein the chains of polypropylene oxides, copolymers of ethylene oxide and propylene oxide or mixtures thereof are predominantly greater than about 15 monomer units, more preferably about 20 monomer units or greater and most preferably 30 monomer units or greater. More preferably, the number of monomer units per chain in the chains of polypropylene oxides, copolymers of ethylene oxide and propylene oxide or mixture thereof is about 120 or less and most preferably about 60 monomer units or less. "Predominantly" means that the great majority of the chains of the one or more polypropylene oxides, copolymers of ethylene oxide and propylene oxide or mixtures thereof have equivalent weights or the recited monomer units as recited. More preferably, substantially all of the chains of the residue of the one or more polypropylene oxides, copolymers of ethylene oxide and propylene oxide or mixtures thereof exhibit equivalent weights or monomer units as described. "Substantially all" and "consists essentially of" mean that there may be a minor amount of the polymer chains which do not meet the equivalent weight or monomer unit limitations but such minor amount does not have any impact on the properties of the cured composition of the invention. In another preferred embodiment, the isocyanate functional group containing prepolymers and/or the isocyanate reactive compounds consist of one or more prepolymers or isocyanate reactive compounds having in their backbone chains of one or more polypropylene oxides, copolymers of ethylene oxide and propylene oxide or mixtures thereof wherein the chains exhibit an equivalent weight or monomer unit content as recited. "Consists of" means that the resulting isocyanate functional prepolymers or the isocyanate reactive compounds contain polypropylene oxides, copolymers of ethylene oxide and propylene oxide or mixtures thereof wherein all of the chains exhibit equivalent weights or monomer contents as recited. In one preferred embodiment, the one or more isocyanate functional components have aromatic isocyanate functional groups which comprise one or more polyisocyanates having aromatic isocyanate functional groups and one or more isocyanate functional group containing prepolymers having in their backbones the residue of one or more chains of one or more polypropylene oxides, copolymers of ethylene oxide and propylene oxide or mixtures thereof wherein equivalent weight of the chains are predominantly greater than about 780 and having aromatic isocyanate functional groups; and the isocyanate reactive component comprises one or more polypropylene oxides, copolymers of ethylene oxide and propylene oxide or mixtures thereof having equivalent weights predominantly about 960 or greater and terminal groups which are reactive with isocyanate groups.

Chains as used herein with respect to propylene oxides and copolymers of propylene oxides and ethylene oxide refer to polymer segments of only propylene oxide or propylene oxide and ethylene oxides and does not include the initiators. The weights and number of monomer units referred to herein relative to chains of propylene oxide or propylene oxide and ethylene oxide are quoted on an equivalents basis.

In a preferred embodiment, the isocyanate group containing prepolymer does not contain chains of polypropylene oxide or copolymers of ethylene oxide and propylene oxide having equivalent weights of less than about 780, more preferably less than about 960, even more preferably less than about 1,000 and most preferably less than about 1,500. In a preferred embodiment, the isocyanate functional group containing component does not contain prepolymers having in its backbone chains of polypropylene oxides, copolymers of ethylene oxide and propylene oxide having equivalent weights of greater than about 4,000, more preferably about greater than about 3,000 or greater and most preferably greater than about 2,000 or greater. In one preferred embodiment, the isocyanate containing component does not contain a chain of polypropylene oxide or copolymers of ethylene oxide and propylene oxide having less than about 15 monomer units, more preferably less than about 20 monomer units and most preferably less than about 30 monomer units. In a preferred embodiment, the isocyanate containing component does not contain a chain of polypropylene oxide copolymers of ethylene oxide and propylene oxide having greater than about 120 monomer units per chain and most preferably greater than about 60 monomer units per chain.

The aromatic isocyanate functional component may be present in the composition in a sufficient amount such that the curable compositions exhibit rapid cure rates, especially as measured by lap shear strength at 1 and 4 hours from contacting the two parts, and the cured composition has sufficient strength for its designed purpose, in the case of adhesive systems such that the adhesive is capable of bonding substrates together and to provide the desired cohesive and adhesive strengths. Preferably, the aromatic isocyanate functional component is present in an amount of about 10 percent by weight or greater based on the weight of the composition, more preferably about 30 percent by weight or greater and most preferably about 50 percent by weight or greater. Preferably, the aromatic isocyanate functional component is present in an amount of about 65 percent by weight or less based on the weight of the composition, more preferably about 60 percent by weight or less and most preferably about 55 percent by weight or less. The percentages stated are selected such that the ratios of equivalents of aromatic isocyanate groups to isocyanate reactive groups meet the requirements stated hereinbefore.

The aliphatic isocyanate functional component may be present in the composition in a sufficient amount such that the curable compositions exhibit sufficient strength for its designed purpose, in the case of adhesive systems such that the adhesive is capable of bonding substrates together and to provide the desired cohesive and adhesive strengths. Preferably, the aliphatic isocyanate functional component is present in an amount of about 1 percent by weight or greater based on the weight of the composition, more preferably about 3 percent by weight or greater and most preferably about 5 percent by weight or greater. Preferably, the aliphatic isocyanate functional component is present in an amount of about 20 percent by weight or less based on the weight of the composition, more preferably about 15 percent by weight or less and most preferably about 10 percent by weight or less. The percentages stated are selected such that the ratios of equivalents of aliphatic and aromatic isocyanate groups to isocyanate reactive groups meet the requirements stated hereinbefore.

The compositions may comprise one or more curing agents located in the second part. Curing agents are compounds that contains greater than one isocyanate reactive group, preferably hydroxyl or amine functional groups. The curing agents can be one or more chain extenders, crosslinking agents, polyols or polyamines, or prepolymers as described herein having isocyanate reactive groups. Polyols as described hereinbefore can be utilized as curing agents. The prepolymers can be prepared by the reaction of polyisocyanates with compounds containing isocyanate reactive compounds utilizing excess equivalents of isocyanate reactive groups such that the resulting prepolymers contain isocyanate reactive groups.

The isocyanate functional curable compositions may further comprise one or more low molecular weight compounds having two or more isocyanate reactive groups and a hydrocarbon backbone wherein the backbone may further comprise one or more heteroatoms. Such low molecular weight compounds may be chain extenders, such compounds are difunctional, or crosslinkers, having greater than two active hydrogen groups per compound. The heteroatoms in the backbone can be oxygen, sulfur, nitrogen or a mixture thereof, wherein oxygen, nitrogen or a mixture thereof is more preferred and oxygen is most preferred. Preferably, the molecular weight of the low molecular weight compound is about 120 or less and more preferably about 100 or less. Preferably, the low molecular weight compound comprises one or more multifunctional alcohols, multifunctional alkanol amines, one or more adducts of multifunctional alcohol and an alkylene oxide, one or more adducts of a multifunctional alkanol amine and an alkylene oxide or a mixture thereof. Among preferred multifunctional alcohols and multifunctional alkanol amines are ethane diol, propane diol, butane diol, hexane diol, heptane diol, octane diol, glycerine, trimethylol propane, pentaerythritol, neopentyl glycol, ethanol amines (diethanol amine, triethanol amine) and propanol amines (di-isopropanol amine, tri-isopropanol amine) and the like. Blends of various low molecular weight compounds may be used. The low molecular weight compound is used in a sufficient amount to obtain the desired G-Modulus (E-Modulus). The low molecular compound may be located in the resin side, the curative side or both, preferably, the curative side. Preferably, the low molecular weight compound is present in composition in an amount of about 2 percent by weight or greater, more preferably about 3 percent by weight or greater and most preferably about 4.0 percent by weight or greater. Preferably, the low molecular weight compound is present in the composition in an amount of about 16 percent by weight or less, more preferably about 12 percent by weight or less and most preferably about 10 percent by weight or less.

The curative part may further comprise polyoxyalkylene polyamine having 2 or greater amines per polyamine. Preferably, the polyoxyalkylene polyamine has 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™ D-T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the curable composition in an amount of about 0.2 percent by weight or greater, more preferably about 0.3 percent by weight or greater and most preferably about 0.5 percent by weight or greater. Preferably, the polyoxyalkylene polyamine is present in the curable composition in an amount of about 6 percent by weight or less, more preferably about 4 percent by weight or less and most preferably about 2 percent by weight or less.

The prepolymers useful in the invention and the compositions of the invention may further comprise a plasticizer commonly used in polyurethane compositions. The composition may contain plasticizers in both components. The plasticizer is present in an amount sufficient to disperse the prepolymer in the final adhesive composition. The plasticizer can be added to the adhesive either during preparation of the prepolymer or during compounding of the adhesive composition. Exemplary plasticizers include straight and branched alkylphthalates, such as diisononyl phthalate, dioctyl phthalate and dibutyl phthalate, a partially hydrogenated terpene commercially available as "HB-40", trioctyl phosphate, alkylsulfonic acid esters of phenol, toluenesulfamide, adipic acid esters, castor oil, xylene, 1-methyl-2-pyrrolidinone and toluene. Preferably plasticizers are branched plasticizers, such as branched chain alkyl phthalates for example di-isononyl phthalates (available under the Trademark PLATINOL N from BASF. The amount of plasticizer used is that amount sufficient to give the desired rheological properties and disperse the components in the curable composition. Preferably, the plasticizer is present in about 1 percent by weight or greater of the composition, more preferably about 5 percent by weight or greater and most preferably about 10 percent by weight or greater. Preferably, the plasticizer is present in about 50 percent by weight or less of the composition and more preferably about 40 percent by weight or less.

The composition may comprise components to control the rheology, viscosity, pumpability and the sag characteristics. The materials included in the composition for these purposes include one or more fillers, one or more isocyanate functional polyester based prepolymers, or a mixture thereof. These materials are added in a sufficient amount such that the composition exhibits the desired rheology, viscosity and the sag characteristics. Preferably these components are added such that the composition exhibits a press flow viscosity (at room temperature, 4 bar pressure 2 mm nozzle, 18 mm length) of about 10 grams per minute or higher, more preferably about 15 grams per minute or higher and most preferably about 20 grams per minute or higher to allow for application by a manual dispensing gun.

The composition may comprises one or more fillers. Fillers are added for a variety of reasons as described hereinbefore and one or more types of fillers may be utilized in the composition of this invention. Fillers may be added to reinforce the composition, to impart the appropriate viscosity and rheology and to strike a balance between cost and the desired properties of the composition and the parts of the composition. Preferred classes of fillers comprise one or more reinforcing fillers, such as one or more carbon blacks, one or more clays or non-pigmented fillers, one or more thixotropes or combinations thereof. In a preferred embodiment, the fillers comprise one of more reinforcing carbon blacks and one or more clays.

One preferred group of fillers are fillers that impart a balance of cost and viscosity to each part and comprise clays and non-pigmented fillers. Such fillers are used in a sufficient amount to impart an acceptable balance of viscosity and cost to the formulation and to achieve the desired properties of the composition. Among fillers useful for this purpose are clays, untreated and treated talc, and calcium carbonates. Preferred clays useful in the invention include kaolin, surface treated kaolin, calcined kaolin, aluminum silicates and surface treated anhydrous aluminum silicates. Kaolin is also known as Kaolinite and comprises compounds represented by the chemical formula $Al_2Si_2O_5(OH)_4$, and it most often occurs as clay-sized, platelike, hexagonally shaped crystals. The clays can be used in any form which facilitates formulation of a composition having the desired properties, for example a composition that can be utilized a hand-dispensable adhesive. Preferably, the clay is admixed in the form of pulverized powder, spray-dried beads or finely ground particles. Preferably, the clays or non-pigmented fillers are present in an amount sufficient to render the rheology of the composition suitable to function as desired, such as an adhesive applicable by hand-gun. Preferably the clays or non-pigmented fillers may be used in an amount of about 0 percent by weight or greater of the composition, more preferably about 3 percent by weight or greater, and even more preferably about 5 percent by weight or greater, even more preferably about 10 percent by weight or greater and most preferably about 16 percent by weight or greater. Preferably, the clays or non-pigmented fillers may be used in an amount of about 60 percent by weight or less of the composition of the invention and more preferably about 50 percent by weight or less.

The composition may further comprise a reinforcing filler which is present in a sufficient amount to improve the strength and rheology of the composition. The preferred class of reinforcing fillers comprises one or more forms of carbon black. Preferably, the reinforcing filler is present in an amount such that the compositions is nonconductive, exhibiting an impedance of the composition of at least $10^{10}$ Ohm-cm. If too much of certain reinforcing fillers, such as one or more forms of carbon black are present, the composition may be conductive. The carbon black used may be a standard carbon black, which is not specifically surface treated or oxidized to render it nonconductive. One or more nonconductive carbon blacks, which may be specifically surface treated or oxidized to render it nonconductive, may be used in conjunction with the standard carbon black. The amount of standard carbon black in the composition is that amount which provides the desired color, viscosity, sag resistance and strength. If non conductivity is desired, standard carbon black may be utilized at a level at which the composition is nonconductive. In a preferred embodiment reinforcing filler is a high surface area carbon black. In one embodiment, high surface area carbon black is carbon black that exhibits an oil absorption of about 110 cc/100 g or greater and preferably about 115 cc/100 g or greater. In another embodiment, high surface area carbon black is carbon black that exhibits an iodine number of about 130 mg/g or greater and preferably about 150 mg/g or greater. Preferably the high surface area carbon black exhibits both of the defined oil absorbtion and iodine properties. Preferred high surface area carbon blacks include ELFTEX™57100, MONARCH RAVEN™ 1040 and RAVEN™ 1060 carbon blacks. The reinforcing filler is preferably present in the composition, based on the weight of the composition, in an amount by about 0 percent by weight or greater, more preferably by about 10 percent by weight or greater and most preferably about 14 percent by weight or greater. The reinforcing filler based on the weight of the composition, in an amount of about 20 percent by weight or less, more preferably about 18 percent by weight or less, and most preferably about 16 percent by weight or less. If conductive carbon black is used and a nonconductive composition is desired, attention must be paid to keep the concentration below about 18 percent by weight to prevent the impedance of the composition to be above $10^{10}$ Ohm-cm. Standard carbon blacks are well known in the art and include RAVEN™ 790, RAVEN™ 450, RAVEN™ 500, RAVEN™

430, RAVEN™ 420 and RAVEN™ 410 carbon blacks available from Colombian and CSX™ carbon blacks available from Cabot, and PRINTEX™30 carbon black available from Degussa. Nonconductive carbon blacks include RAVEN™ 1040 and RAVEN™ 1060 carbon black available from Colombian.

The adhesive composition may further comprise fillers which functions as a thixotrope (rheological additive). Such thixotropes are well known to those skilled in the art and include fumed silica and the like. Preferred fumed silicas include organically modified fumed silicas. The thixotrope may be added to the composition in a sufficient amount to give the desired rheological properties. Preferably, the thixotrope is present in an amount of about 0 percent by weight or greater based on the weight of the composition, preferably about 2.0 percent by weight or greater. Preferably, the optional thixotrope is present in an amount of about 10 percent by weight or less based on the weight of the composition and more preferably about 8 percent by weight, most preferably about 6 or less.

The isocyanate functional component may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based prepolymer prevents the window from sliding after installation. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. Preferably, the polyester polyol based isocyanate prepolymer is present in the adhesive composition in sufficient amount to support the needed green strength and the desired rheology of the composition. If the amount is too high, an adhesive composition is not hand gun applicable at ambient temperature. Preferably, the polyester polyol based isocyanate prepolymer is present in the adhesive composition in an amount of about 0 percent by weight or greater based on the weight of the adhesive composition, more preferably about 1 percent by weight or greater and most preferably about 2 percent by weight or greater. Preferably, the polyester polyol based isocyanate prepolymer is present in the adhesive composition in an amount of about 10 percent by weight or less, even more preferably about 5 percent by weight or less and most preferably about 3 percent by weight or less. The polyester polyol can be any polyester composition that meets the property requirements defined, which is crystalline at ambient temperatures and melts in the desired temperature range. Preferred polyester polyols are available from Creanova under the trade name DYNACOL and the designations 7381, 7360 and 7330, with 7381, most preferred.

The isocyanate functional component may further comprise a polyfunctional isocyanate for the purpose of improving the modulus of the composition in the cured form. "Polyfunctional" as used in the context of the isocyanates refers to isocyanates having a functionality of 2.4 or greater. The polyisocyanates can be any having a nominal functionality of about 2.4 or greater, more preferably about 2.7 or greater. Preferably, the polyfunctional isocyanates have a nominal functionality of about 5 or less, even more preferably about 4.5 or less and most preferably about 4.2 or less.

The polyfunctional isocyanates can be any isocyanates which are reactive with the isocyanate polyisocyanate prepolymers used in the composition and which improve the modulus of the cured composition. The polyisocyanates can be monomeric; trimeric isocyanurates or biurets of monomeric isocyanates; oligomeric or polymeric, the reaction product of several units of one or more monomeric isocyanates and can be aliphatic or aromatic. Exemplary aliphatic polyfunctional isocyanates include trimers of hexamethylene diisocyanate, such as those available from Bayer under the trademark and designation DESMODUR N3300, DESMODUR N3400, DESMODUR N-100. Exemplary d aromatic polyfunctional isocyanates include polymeric isocyanates such as polymeric MDI (methylene diphenyl diisocyanates) such as those marketed by The Dow Chemical Company under the trademark of PAPI or VORANATE, including VORANATE M220, PAPI 20 and PAPI 27 polymeric isocyanates. The polyfunctional isocyanates are present in a sufficient amount to impact the modulus of the cured compositions of the invention. If too much is used, the cure rate of the composition is unacceptably slowed down. If too little is used, the desired modulus levels are not achieved. The polyfunctional isocyanates are preferably present in an amount of about 0.5 percent by weight or greater based on the weight of the composition. The polyfunctional isocyanates are preferably present in an amount of about 35 percent by weight or less, based on the weight of the composition, more preferably about 25 percent by weight or less and most preferably about 20 percent by weight or less.

The compositions may also contain one or more catalysts which catalyzes the reaction of isocyanate moieties with isocyanate reactive moieties, i.e. water or an active hydrogen containing compound. Among preferred catalysts are organotin compounds, metal alkanoates, and tertiary amines. Mixtures of classes of catalysts may be used, such as a mixture of a tertiary amine and one or more of organotin compounds and metal alkanoates. Even more preferred are tertiary amines, such as dimorpholino diethyl ether, and a metal alkanoate, such as bismuth octoate. Included in organotin compounds are alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. Preferred organotin compounds are dialkyltin dicarboxylates and dialkyltin dimercaptides. Dialkyl tin dicarboxylates with lower total carbon atoms are preferred as they are more active catalysts in the compositions. Preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organo tin compounds or metal alkanoates may be present in an amount of about 60 parts per million or greater based on the weight of the composition, more preferably 120 parts by million or greater. The organo tin compounds or metal alkanoates may be present in an amount of about 1.0 percent or less based on the weight of the composition, more preferably 0.5 percent by weight or less and most preferably 0.2 percent by weight or less.

Exemplary tertiary amine catalysts include dimorpholinodialkyl ether, a di((dialkyl-morpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine, diazabicyclo compounds and mixtures thereof. A preferred dimorpholinodialkyl ether is dimorpholinodiethyl ether. A preferred di((dialkylmorpholino)alkyl)ether is (di-(2-(3,5-dimethylmorpholino)ethyl)-ether). Diazabicyclo compounds are compounds which have diazobicyclo structures. Preferred diazabicyclo compounds include diazabicycloalkanes and diazabicyclo alkene salts. In some embodiments the catalyst may comprise one or more diazabicycloalkanes and one or more diazabicyclo alkene salts. Preferably the mole ratio of the one or more diazabicycloalkanes to the one or more diazabicycloalkene salts is preferably about 1:9 or greater; more preferably about 2:8 or greater; and most preferably about 4:6 or greater. Preferably, the mole ratio of the one or more diazabicycloalkanes to the one or more diazabicycloalkene salts is preferably about 9:1 or less; more preferably about 8:2 or less; and most preferably about 6:4 or less. Preferred diazabicycloalkanes include diazabicyclooctane, available from Air Products under the trademark and designations, DABCO, DABCO WT, DABCO DC 1, DABCO DC 2, and DABCO DC 21. Preferred diazabicycloalkene salts include diazabicycloundecene in the phenolate, ethylhexoate, oleate and formate salt forms, available from Air Products under the trademark and designations, POLYCAT SA 1, POLYCAT SA 1/10, POLYCAT SA 102 and POLYCAT SA 610. In a preferred embodiment, one or more diazabicyclo compounds and one or more organo tin or metal alkanoate compounds and/or tertiary amine catalysts are present in the adhesive system. Tertiary amines are preferably employed in an amount, based on the weight of the composition of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.5 percent by weight or less, and most preferably about 1.2 percent by weight or less.

The composition of this invention may further comprise stabilizers, which function to protect the adhesive composition from moisture, thereby inhibiting advancement and preventing premature crosslinking of the isocyanates in the curable composition. Stabilizers known to the skilled artisan for moisture curing adhesives may be used preferably herein. Included among such stabilizers are diethylmalonate, alkylphenol alkylates, paratoluene sulfonic isocyanates, benzoyl chloride, phosphoric acid and orthoalkyl formates. Such stabilizers are preferably used in an amount of about 0.1 parts by weight or greater based on the total weight of the curable composition, preferably about 0.5 parts by weight or greater and more preferably about 0.8 parts by weight or greater. Such stabilizers are used in an amount of about 5.0 parts by weight or less based on the weight of the curable composition, more preferably about 2.0 parts by weight or less and most preferably about 1.4 parts by weight or less.

In some embodiments the composition may further comprise an adhesion promoter, such as those disclosed in Mandi, U.S. Patent Publication 2002/0100550 paragraphs 0055 to 0065 and Hsieh, U.S. Pat. No. 6,015,475 column 5, line 27 to column 6, line 41 incorporated herein by reference. Preferably the adhesion promoter contains a silane present in some form. Preferable methods of including silane functionality in the compositions are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The silane may be blended with the prepolymer. In some embodiments the has one or more active hydrogen atom which are reactive with an isocyanate. Preferably such silane is a mercapto-silane or an amino-silane and more preferably is a mercapto-trialkoxy-silane or an amino-trialkoxy silane. In some embodiments, the silanes having, active hydrogen atoms reactive with isocyanate moieties, can be reacted with the terminal isocyanate moieties of the prepolymer. Such reaction products are disclosed in U.S. Pat. Nos. 4,374,237 and 4,345,053 relevant parts incorporated herein by reference In other embodiments, silanes having reactive hydrogen moieties reactive with isocyanate moieties can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. Preferably the adduct is a reaction product of a secondary amino- or mercapto-alkoxy silane and a polyisocyanate, the adduct having an average of at least one silane group and at least one isocyanate group per molecule (hereinafter "adduct"). Exemplary polyisocyanates for use in preparing the adduct include those described above as suitable for use in preparing the prepolymer, particularly including isophorone diisocyanate, polymethyl-ene polyphenylisocyanates, and aliphatic polyisocyanate such as hexamethylene diisocyanate. Exemplary organo functional silanes useful as adhesion promoters or to prepare adducts include amino- or mercapto-alkoxy silanes, isocyanato alkoxy silanes, methacryloxy silanes, epoxy alkoxy silanes, alkenyl alkoxy silanes and the like. Examples of such compounds include: N,N-bis[(3-triethoxysilyl) propyl]amine; N,N-bis[(3-tripropoxy-silyl) propyl]amine; N-(3-trimethoxy-silyl) propyl-3-[N-(3-trimethoxysilyl)-propylamino]propionamide; N-(3-triethoxysilyl)propyl-3-[N-3-triethoxysilyl)-propylamino]propionamide; N-(3-trimethoxysilyl)propyl-3-[N-3-triethoxy-silyl)-propylamino]-propionamide; 3-trimethoxysilylpropyl 3-[N-(3-trimethoxysilyl)propylamino]-2-methylpropionate; 3-triethoxysilyl propyl 3-[N-(3-triethoxysilyl)-propylamino]-2-methyl propionate; 3-trimethoxysilylpropyl 3-[N-(3-triethoxysilyl)propylamino]-2-methyl propionate; and the like. Preferably the organo functional silane is gamma-mercaptopropyl-trimethoxysilane (available as A189 from Union Carbide) or N,N'-bis((3-trimethoxysilyl) propyl)amine. The amount of adhesion promoter present is that amount which enhances the adhesion of the adhesive to the substrate surface. The amount of adhesion promoter present is preferably about 0.1 percent by weight or greater based on the weight of the adhesive and most preferably about 0.5 percent by weight or greater. The amount of adhesion promoter used is preferably about 10 percent by weight or less and most preferably about 2.0 percent by weight or less. The adhesion promoter can be located in either or both parts of a two part adhesive or in a one part adhesive.

Other components commonly used in curable compositions may be used in the compositions of this invention. Such materials are well known to those skilled in the art and may include ultraviolet stabilizers and antioxidants and the like. As used herein all parts by weight relative to the components of the curable composition are based on 100 total parts by weight of the curable composition. In compositions useful in preparing molded parts, the compositions may further comprise components commonly used in molding parts such as mold release agents, fillers, conductive components and the like. In compositions used to form foams, such compositions may further comprise ingredients commonly used in foam forming compositions, such as blowing agents, mold release agents, skin forming agents and the like.

The composition may be formulated by blending the components together using means well known in the art. Generally, the components are blended in a suitable mixer. Such blending is preferably conducted in an inert atmosphere in the absence of oxygen, for instance under vacuum, and atmospheric moisture to prevent premature reaction. It may be advantageous to add plasticizers to the reaction mixture for preparing the isocyanate functional prepolymers so that such mixtures may be easily mixed and handled. Alternatively, the plasticizers can be added during blending of all the components. Preferably, the materials are blended under vacuum or an inert gas, such as nitrogen or argon. The ingredients are blended for a sufficient time to prepare a well blended mixture, preferably from about 10 to about 60 minutes. The aliphatic isocyanate containing component may be added to the reaction mixture utilized to prepare a prepolymer, such as a prepolymer containing aromatic isocyanate groups, after formation of the prepolymer is complete. This may be achieved without cooling the reaction mixture or can be achieved after the reaction mixture cools. The prepolymers are prepared prior to blending the components to form the two parts of the curable composition. The two parts of the composition are blended separately. Once the composition is formulated, it is packaged in a suitable container such that it is protected from moisture and oxygen to prevent premature crosslinking of the prepolymers containing isocyanate groups.

The compositions may be used to bond a variety of substrates together as described hereinbefore. The two parts are contacted. The contacted composition is applied to a substrate and the composition on the first substrate is thereafter contacted with a second substrate. In preferred embodiments, the surfaces to which the composition is applied are cleaned and/or activated and/or primed prior to application; see for example, U.S. Pat. Nos. 4,525,511; 3,707,521 and 3,779,794, all are incorporated herein by reference in their entirety. Curing can be accelerated by applying heat to the curing composition by means of convection heat, impingement heat, IR heating, induction heating, microwave heating and the like. Preferably, the adhesive composition is formulated to provide an open time of at least about 3 minutes or greater more preferably about 5 minutes or greater. "Open time" is understood to mean the time after application of the composition to a first substrate until it starts to become a high viscous paste and is not subject to deformation during assembly to conform to the shape of the second substrate and to adhere to it. The compositions preferably exhibit tack free times of about 3 minutes or greater and most preferably about 5 minutes or greater. The compositions preferably exhibit lap shear strengths after one hour of about 0.5 MPa or greater, more preferably about 1.0 MPa or greater and most preferably about 3.5 MPa or greater. The compositions preferably exhibit lap shear strengths after four hours of about 3.0 MPa or greater, 4.0 MPa or greater, more preferably about 5.0 MPa or greater and most preferably about 9.0 MPa or greater. The compositions preferably exhibit lap shear strengths after seven days of about 8.0 MPa or greater and more preferably about 15.0 MPa or greater.

In use, the components of two-part compositions are mixed. For two-part compositions to be most easily used in commercial and industrial environments, the volume ratio at which the two parts are combined is preferably a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. Typically, these dispensers use a pair of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable composition is extruded from the mixing chamber onto a substrate. When using electrically-driven equipment, dynamic mixing may be used. Once the tubes have been emptied, they can be replaced with fresh tubes and the application process continued. The volumetric ratio at which the two parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two parts of the polymerizable composition at a convenient mix ratio. Some common mix ratios are 1:1, 2:1, 4:1 and 10:1 and can also be odd ratios. Preferably, the two parts are blended at a mix ratio of about 1:1.

Preferably, the mixed two-part compositions of the invention have a suitable viscosity to allow application without dripping. Preferably, the viscosities of the two individual components should be of the same order of magnitude. Preferably, for compositions mixed utilizing static mixing, the components prior to cure have a viscosity of about 10 Pa·S (10,000 centipoises) or greater, more preferably about 20 Pa·S (20,000 centipoises) or greater and most preferably about 40 Pa·S (40,000 centipoises) or greater. Preferably, the two parts of the compositions have a viscosity prior to contacting of about 300 Pa·S (300,000 centipoises) or less, more preferably about 200 Pa·S (200,000 centipoises) or less and most preferably about 150 Pa·S (150,000 centipoises) or less. "Viscosities" as used in this passage are determined at a shear rate of 1 reciprocal second measured with a cone plate rheometer of 20 mm diameter and 4° angle and a temperature of about 25° C. Higher viscosities require dynamic mixing. For lower viscosities, the components may require gelling agent known in the art to prevent sag of the uncured adhesive system. Two-part adhesive compositions start to cure upon mixing the two parts.

Molecular weights as described herein are number average molecular weights, unless otherwise specified, which may be determined by Gel Permeation Chromatography (also referred to as SEC). For polyurethane prepolymers, it is also possible to calculate approximate number average molecular weight from the equivalent ratio of the isocyanate compounds and of the polyol compounds with which they are reacted as known to the persons skilled in the art.

Illustrative Embodiments of the Invention

The following examples are provided to illustrate the invention, but are not intended to limit the scope thereof. All parts and percentages are by weight unless otherwise indicated.

Examples Procedure

Three part 1 compositions are prepared using the materials and amounts disclosed in Table 1, which are blended using the under vacuum at 60° C. for about 45 minutes so as to form an aromatic isocyanate containing prepolymer. After the prepolymer is formed, where utilized, the hexamethylene di-isocyanate based trimer is added after blending all of the other components under vacuum without cooling the mixture. Part 2 is prepared by blending the materials and amounts listed in Table 2 under a vacuum at ambient temperatures for about 45 minutes.

Lap shear samples are prepared using steel substrates of 100×25×1 mm. The adhesive area is 25 mm×10 mm×2 mm. Part 2 is contacted separately with the Part 1 samples and applied to one of the steel surfaces using an air driven dual cartridge gun with a static Sulzer Quadro 8.7×24 mixer at a 1.0 to 1.0 volume mixing ratio. The samples are cured at ambient temperature for the recited cure time and tested for lap shear strength using a tensile testing machine according to test method DIN 1465 and pull rate of 10 mm/min.

Ingredients
Polyalkyleneoxide triol, Voranol CP 4610 polyol, having a molecular weight of 4500.
Glycerin initiated polyglycol amine, Jeffamine 400 polyamine, having a molecular weight of 400.
Monoethylene glycol.
Dibutyl tin dilaurate.
1,4-diazabicyclo[2.2.2]octane available under the trademark and designation DABCO 33LV.
Calcined clay
Molecular sieve 3A
Polymeric methylene diphenyl isocyanate available under the trademark and designation Voranate M220 having a functionality of 2.7 and an equivalent weight of about 136.
Carbodiimide modified methylene diphenyl di-isocyanate, available under the Trademark and designation, ISONATE M143, having a functionality of 2.2 and an equivalent weight of 143.
Hexamethylene di-isocyanate based Uretdion, available under the trademark and designation DESMODUR N3400, having an equivalent weight of 193 and an NCO content of about 21.8.

TABLE 1

| Resin Blends | | | |
| --- | --- | --- | --- |
| Component | Resin 1 g | Resin 2 g | Resin 3 g |
| Polymeric methylene diphenyl isocyanate | 657 | 589.5 | 522 |
| Carbodiimide modified methylene diphenyl di-isocyanate | 657 | 591.0 | 523.5 |
| Polyalkylene triol | 603 | 556.5 | 511.5 |
| Calcined clay | 1083 | 1083 | 1083 |
| Hexamethylene di-isocyanate based uretdione | 0 | 180 | 360 |

TABLE 2

| Curative | |
| --- | --- |
| Ingredient | g |
| Polyalkylene triol | 1581.5 |
| Glycerin initiated polyglycol amine | 105.0 |
| Monoethylene glycol | 201 |
| Dibutyl tin dilaurate | 4.5 |
| 1,4-diazabicyclo[2.2.2]octane | 3.0 |
| Calcined clay | 955 |
| Molecular sieve 3A | 150 |

Lap shear samples are tested as described before. The tack free time is tested according to following procedure: A bead of sample material (approx. 30-50 cm of length and 10 mm wide; approx. 0.5 g/mm) is applied on the PE-foil. In short intervals, the sample is touched lightly with the wooden spatula until no material is pulled of the bead. The difference between the start and the final time is the tack free time. E-Modulus, tensile strength and elongation are tested according to DIN 53304. The results are compiled in Table 3.

TABLE 3

| Item/Test | Cure Time | Resin 1 | Resin 2 | Resin 3 |
| --- | --- | --- | --- | --- |
| Isocyanate Index Aromatic | | 120 | 107 | 95 |
| Isocyanate Index Total | | 120 | 120 | 120 |
| Tack free time, min | | 2.5 | 3.5 | 4 |
| Lap shear strength, MPa | 1 hour | 2.3 | 3.6 | 4 |
| Lap shear strength, MPa | 4 hours | 6.2 | 9.7 | 9.4 |
| Lap shear strength, MPa | 1 day | 12.1 | 13.1 | 12.1 |
| Lap shear strength, MPa | 3 days | 14.9 | 15.2 | 14.4 |
| Lap shear strength, MPa | 7 days | 14.7 | 14.9 | 14.5 |
| E-modulus, MPa | 7 days | 91 | 81 | 118 |
| Tensile Strength, MPa | 7 days | 15.7 | 16.5 | 15.8 |
| Elongation, % | 7 days | 77 | 65 | 75 |

Figure 1:
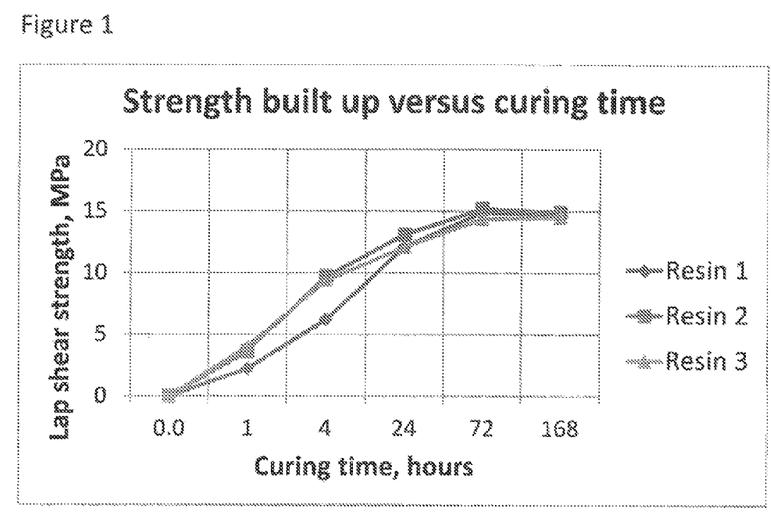
FIG. 1 plots the lap shear strength against the cure time for the tested compositions.
Figure 2:
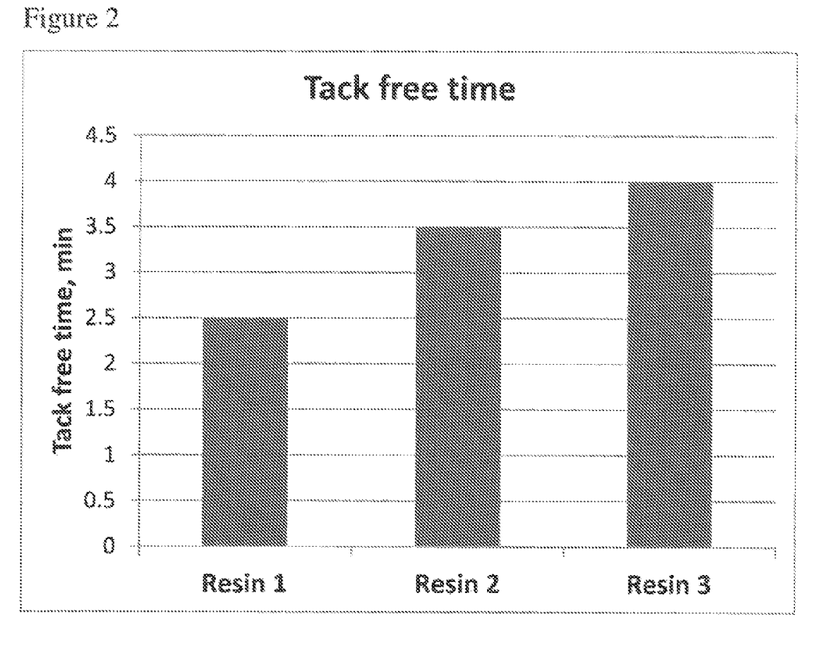
FIG. 2 compares the tack free time of the three tested adhesive.

Table 3 illustrates the physical properties and the curing behavior depending on aromatic and total Isocyanate index. FIG. 1 plots the lap shear strength against the cure time. FIG. 2 compares the tack free time of the adhesives containing the three resins.

What is claimed is:
1. A composition comprising
   in Part 1
   a) one or more isocyanate functional components having aromatic isocyanate functional groups which comprises one or more prepolymers having aromatic isocyanate functional groups;
   b) one or more isocyanate functional components having aliphatic isocyanate functional groups;
   in Part 2
   c) one or more compounds having more than one isocyanate reactive groups;
   d) one or more fillers in one or both parts comprising one or more clays; and
   e) one or more catalysts which catalyze the reaction of isocyanate functional groups with isocyanate reactive groups:
   wherein the ratio of aromatic isocyanate functional groups to isocyanate reactive groups is from 0.95 to 1.05 and the ratio of aromatic isocyanate functional groups and aliphatic isocyanate functional groups to isocyanate reactive groups is from 1.10 to 1.30; and the one or more isocyanate functional components having aromatic isocyanate functional groups comprises one or more polyisocyanates having aromatic isocyanate functional groups and one or more isocyanate functional group containing prepolymers having in their backbones the residue of one or more chains of one or more polypropylene oxides, copolymers of ethylene oxide and propylene oxide or mixtures thereof wherein equivalent weight of the chains are predominantly greater than about 780 and having aromatic isocyanate functional groups; and the isocyanate reactive component comprises one or more polypropylene oxides, copolymers of ethylene oxide and propylene oxide or mixtures thereof having equivalent weights predominantly about 960 or greater and terminal groups which are reactive with isocyanate groups, and one or more low molecular weight compounds having two or more isocyanate reactive groups and a molecular weight of 120 or less.

2. A composition according to claim 1 wherein the copolymers of ethylene oxide and propylene oxide contain about 5 to about 40 percent by weight of ethylene oxide units.

3. A composition according to claim 1 wherein the lap shear strength of the composition 4 hours after application to substrates is about 9.0 MPa or greater.

4. A composition according to claim 1 wherein the lap shear strength of the composition 1 hours after application to substrates is about 3.5 MPa or greater.

5. A composition according claim 1 wherein the composition after contacting the two parts exhibits a tack free time of about 3 minutes or greater.

6. A method of bonding two or more substrates together comprising acting Part 1 and Part 2 according to claim 1;
ii) contacting the mixture of step i) with one or more substrates;
iii) contacting the substrates together with the mixture of step i) disposed between the substrates; and
iv) allowing the mixture of step i) to cure so as to bond the substrates together.

7. A method according to claim 6 wherein the cure of the mixture of step i) is accelerated by exposing the substrates with the mixture of step i) disposed between the substrates to elevated temperatures.

8. A composition according to claim 1 wherein the ratio of aromatic isocyanate functional groups and aliphatic isocyanate functional groups to isocyanate reactive groups is from 1.10 to 1.20.

9. A composition according to claim 1 wherein the composition further comprises a polyoxyalkylene polyamine having 2 or more amines per polyamine.

10. A composition according to claim 1 wherein the one or more catalysts comprise a mixture of a tertiary amine and one or more of organotin compounds and metal alkanoates.

11. A composition according to claim 1 wherein the one or more isocyanate functional components having aromatic isocyanate functional groups comprise oligomeric aromatic polyisocyanates.

* * * * *

UNITED STATES PATENT AND TRADEMARK OFFICE
CERTIFICATE OF CORRECTION

PATENT NO. : 9,493,604 B2
APPLICATION NO. : 14/379644
DATED : November 15, 2016
INVENTOR(S) : Ulrich Tribelhorn and Dirk Schwoeppe

Page 1 of 1

It is certified that error appears in the above-identified patent and that said Letters Patent is hereby corrected as shown below:

In the Claims

Column 22, at the beginning of Line 1, insert --i) cont--

Signed and Sealed this
Twenty-eighth Day of March, 2017

Michelle K. Lee
*Director of the United States Patent and Trademark Office*